No. 817,934. PATENTED APR. 17, 1906.
R. B. PARSONS.
SPRING WHEEL.
APPLICATION FILED MAR. 15, 1905.
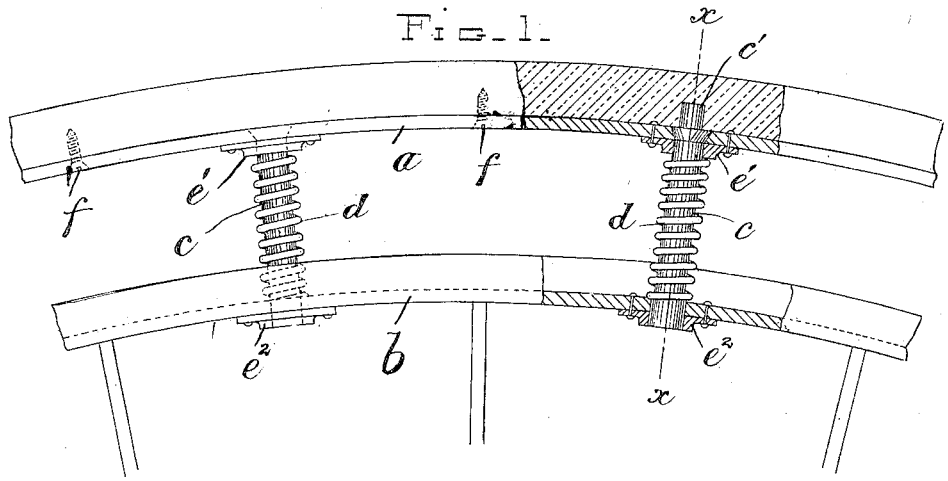
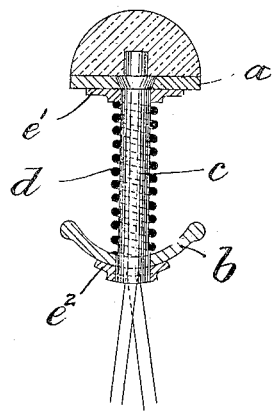
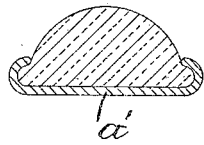
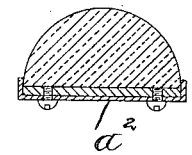

UNITED STATES PATENT OFFICE.

REGINALD BOWDEN PARSONS, OF KINGSTON-UPON-HULL, ENGLAND.

SPRING-WHEEL.

No. 817,954. Specification of Letters Patent. Patented April 17, 1906.

Application filed March 15, 1905. Serial No. 250,261.

*To all whom it may concern:*

Be it known that I, REGINALD BOWDEN PARSONS, a subject of the King of Great Britain and Ireland, residing in the city and county of Kingston-upon-Hull, England, have invented certain new and useful Improvements in Spring-Wheels; and I do hereby declare the following to be a full, clear, and exact description of the invention, such as will enable others skilled in the art to which it appertains to make and use the same.

This invention relates to wheels adapted for cycles, motor-cars, or the like vehicles requiring resilient tires, such as pneumatic tires, and has for its object to construct a wheel in which the resiliency of a pneumatic tire is combined with the security of a solid tire.

In carrying my invention into effect the wheel consists in respect of its tire and tire connections of a pliable rim or outer periphery, preferably flat, which is held in position outside the ordinary rim of the wheel proper, which inner rim being rigid may be either flat or concave, the connection between the two rims consisting of a series of springs and spindles acting in combination and otherwise arranged and fitted between the two rims as hereinafter described, reference being had to the annexed drawings.

As the improvements constituting this invention concern only the tire and the special means by which it is secured in position and adapted for its purpose, the wheel in other respects may be of various forms or designs of construction, as required for various purposes, being as light as possible for cycles and of heavier and stiffer caliber for motor-cars.

It being understood that the resilience is to be imparted to the outer rim only, the inner rim being necessarily rigid as forming the outer or binding frame of the wheel, the resilience necessary for easy riding is obtained by the intervention between the two rims of a system of springs pitched at suitable and equal intervals between the rims and secured in position by spindles.

In the drawings, Figure 1 illustrates, mainly in elevation but partly in section, a sufficient extent of the periphery of a wheel to clearly present those characteristic features which differentiate my invention from various approximations thereto, the rest of the wheel being omitted as forming no part of the invention, and therefore requiring no further description as to its construction, which may be varied as required for different purposes. Fig. 2 is a transverse section taken on line $xx$ of Fig. 1, and Figs. 3 and 4 are sectional detail views of the outer rims and tires, as hereinafter explained.

The outer rim $a$ is a light spring-steel band the inner rim $b$ being preferably of the ordinary concave form, as shown, resilience being essential in the former and rigidity in the latter. The spindles $c$ are rigidly secured to the outer rim $a$, but are free to work in the inner rim $b$, the movement being in the direct line in which the spindle is set. Each spindle is encircled by a spiral spring $d$, abutting against both rims. These springs are of the best steel and carefully adjusted as to strength and compression to set up the requisite resilience in the outer rim $a$, being guided and directed in their action by the spindles $c$. Given a suitable resilience in the outer rim $a$ and the proper rigidity in the inner rim $b$, the practical utilization of the resilience of the outer rim depends upon the combined action of the spindles $c$ and springs $d$, adjusted as follows: The spindles are rigidly connected to the outer rim $a$, but capable of a direct inward and outward movement through the inner rim $b$, subject to the action of and as guiding-supports to the sdrings $d$. Both rims being of thin material are thickened up where the spindles pass through them by the washers $e'$ $e^2$, rigidly secured thereto, so that the spindles can be rigidly secured to rim $a$ by a driving fit through it and the washers $e'$, which is preferable to screwing the spindle into the rim and washer which weakens the spindle-head, the spindle having a sufficient free-play bearing-surface in the inner rim $b$ and washer $e^2$.

In addition to a cement solution the tire may be secured to the outer rim $a$ by screws $f$, supplemented, if desired, by the spindle-heads, projected, as at $c'$, into the tire.

In Figs. 3 and 4 convenient means are shown by which the outer rim $a$ is strengthened for the purposes more especially of motor-cars, in Fig. 3 by flat rim $a'$, with its outer edges bent over, as shown, the increased strength and security of the tire being attained by a sacrifice of resilience, and in Fig. 4 by bands $a^2$, placed at intervals and screwed to the rim $a$; but it is to be understood that I do not exclude myself from other convenient or suitable means for effecting the same purposes.

The combined springs and spindles shown in the drawings as set in central and single file between the outer and inner rims could, if desired, be placed two abreast or in two circumferential files with each file pitched to alternate with the other, and in any case it is preferable to give the springs and spindle an intermediate pitch to that of the spokes, as shown in Fig. 1.

In conclusion, I would observe that I am aware that various attempts have been made to provide a resilient tire for cycle and the like wheels by means of an outer rim mounted on springs. In some cases springs alone have been used without spindles or springs and spindles have both been used but apart from each other, or the spindles have been allowed undue play in one or other of the rims, or have been secured to the inner instead of the outer rim, so that either the outer rim has been able to swerve sidewise relatively to the inner rim or the inner rim has been able to rotate in advance of the outer rim. I therefore make no claim to such approximations to the improvements constituting my invention, by which improvements the outer rim is allowed no deviation from its normal position other than its intended resilience in conjunction with the spiral springs, as hereinbefore described.

Having thus described my invention, what I wish to claim and secure by Letters Patent of the United States, is—

In a spring-wheel, the combination of an inner rim, an outer rim of flat steel, spindles rigidly connected to said outer rim and movable freely through said inner rim, springs encircling said spindles respectively, the outer ends of said spindles being extended outward considerably beyond said outer rim, and a solid-rubber tire encircling said outer rim in which the outwardly-projecting ends of said spindles are embedded, said inner and outer rims being thickened in proximity to said spindles by means of washer-plates secured thereto, substantially as described.

In testimony whereof I affix my signature in presence of two witnesses.

REGINALD BOWDEN PARSONS.

Witnesses:
CHARLES LARARD,
MARY DIXON.